United States Patent
Wang

(10) Patent No.: US 10,116,985 B2
(45) Date of Patent: Oct. 30, 2018

(54) METHOD AND APPARATUS FOR DISPLAYING A BULLET CURTAIN IN A VR VIDEO

(71) Applicant: Beijing Xiaomi Mobile Software Co., Ltd., Beijing (CN)

(72) Inventor: Zhengxiang Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/904,719

(22) Filed: Feb. 26, 2018

(65) Prior Publication Data

US 2018/0262795 A1     Sep. 13, 2018

(30) Foreign Application Priority Data

Mar. 7, 2017   (CN) .......................... 2017 1 0130525

(51) Int. Cl.
| | |
|---|---|
| G09G 5/00 | (2006.01) |
| H04N 21/431 | (2011.01) |
| H04N 21/4415 | (2011.01) |
| H04N 21/442 | (2011.01) |
| H04N 21/4788 | (2011.01) |
| H04N 13/344 | (2018.01) |
| H04N 13/366 | (2018.01) |
| H04N 21/81 | (2011.01) |

(52) U.S. Cl.
CPC ....... *H04N 21/4312* (2013.01); *H04N 13/344* (2018.05); *H04N 13/366* (2018.05); *H04N 21/4415* (2013.01); *H04N 21/44218* (2013.01); *H04N 21/4788* (2013.01); *H04N 21/816* (2013.01)

(58) Field of Classification Search
CPC ............. H04N 21/431; H04N 21/4312; H04N 21/845; H04N 21/472; H04N 21/47217; H04N 21/8456; H04N 13/344; H04N 13/366; H04N 21/816; G09G 5/00
USPC ...... 345/633; 725/34, 37, 100; 348/563, 553
See application file for complete search history.

(56) References Cited

U.S. PATENT DOCUMENTS

| | | | | |
|---|---|---|---|---|
| 9,508,146 | B2* | 11/2016 | Davies | ........................ G06T 3/60 |
| 9,729,819 | B2* | 8/2017 | Im | ......................... G06T 19/006 |
| 2010/0242074 | A1* | 9/2010 | Rouse | ..................... H04L 51/32 |
| | | | | 725/100 |
| 2013/0044128 | A1 | 2/2013 | Liu | |
| 2016/0269712 | A1* | 9/2016 | Ostrover | ................. H04S 7/302 |
| 2017/0039881 | A1* | 2/2017 | Belch | ................. G09B 19/0038 |
| 2017/0064374 | A1* | 3/2017 | Eim | .................... G06F 3/04817 |

(Continued)

FOREIGN PATENT DOCUMENTS

CN           106454387 A      2/2017

OTHER PUBLICATIONS

European Extended Search Report issued in corresponding EP Patent Application No. 18154568.2, dated Jul. 12, 2018, 8 pages.

*Primary Examiner* — Trang U Tran
(74) *Attorney, Agent, or Firm* — Arch & Lake LLP

(57) ABSTRACT

A method and an apparatus are provided for displaying a bullet curtain in a VR video. During playback of the VR video, a VR device may detect a visual field of a user, determine a target bullet curtain to be displayed in the visual field of the user based on location information of a plurality of bullet curtains stored in a bullet curtain library, and then display the target bullet curtain in the display area corresponding to the visual field of the user.

12 Claims, 4 Drawing Sheets

(56) References Cited

U.S. PATENT DOCUMENTS

2017/0171601 A1* 6/2017 Cui .................... H04N 21/4312
2017/0251240 A1* 8/2017 Peng ................... H04N 21/472
2017/0323481 A1* 11/2017 Tran ..................... G06T 19/006

* cited by examiner

METHOD AND APPARATUS FOR DISPLAYING A BULLET CURTAIN IN A VR VIDEO

CROSS REFERENCE TO RELATED APPLICATION

This application is based on and claims priority to Chinese Patent Application No. 201710130525.0, filed on Mar. 7, 2017, which is incorporated herein by reference in its entirety.

TECHNICAL FIELD

The present disclosure relates to Virtual Reality (VR) technology, and more particularly, to a method and an apparatus for displaying a bullet curtain in a VR video.

BACKGROUND

The bullet curtain or barrage subtitles is a technology to display user comments which drift on a screen. At present, the bullet curtain has been more and more widely used. For example, the bullet curtain may be displayed on the screen while a video is being played; the bullet curtain may be added into some live matches or variety shows; and the bullet curtain may also be offered when some cinemas show films. Existing bullet curtains are mainly applied in 2D plane display areas. During playback of the video, a number of bullet curtains sent by other users may pop up from a right side of the screen and slide to the left. In case of playback of a live video, the bullet curtains may be sent by other users in real time; and in case of playback of a recorded video, the bullet curtains may be sent by other users in real time, or may be sent by other users when they have been playing to a current time point in the video.

SUMMARY

In view of the fact in related arts, the present disclosure provides a method and an apparatus for displaying a bullet curtain in a VR video.

According to a first aspect of the present disclosure, a method for displaying a bullet curtain in a VR video is provided. The method may include detecting, by a Virtual Reality (VR) device, a visual field of a user via a motion sensor; determining, by the VR device, a target bullet curtain to be displayed in the visual field of the user based on location information of a plurality of bullet curtains stored in a bullet curtain library; and displaying, by the VR device, the target bullet curtain in a display area corresponding to the visual field of the user.

According to a second aspect of the present disclosure, an apparatus for displaying a bullet curtain in a VR video is provided. The apparatus may include a processor; and a memory configured to store instructions executable by the processor. The processor is configured to detect a visual field of a user via a motion sensor; determine a target bullet curtain to be displayed in the user's visual field based on location information of a plurality of bullet curtains stored in a bullet curtain library; and display the target bullet curtain in a display area corresponding to the visual field of the user.

According to a third aspect of the present disclosure, a non-transitory computer-readable storage medium is provided. The storage medium has stored therein instructions that, when executed by a processor, causes the processor to perform a method for displaying a bullet curtain in a VR video. The method includes detecting a visual field of a user via a motion sensor; determining a target bullet curtain to be displayed in the user's visual field based on location information of a plurality of bullet curtains stored in a bullet curtain library; and displaying the target bullet curtain in a display area corresponding to the visual field of the user.

It is to be understood that both the forgoing general descriptions and the following detailed descriptions are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Figure 1:
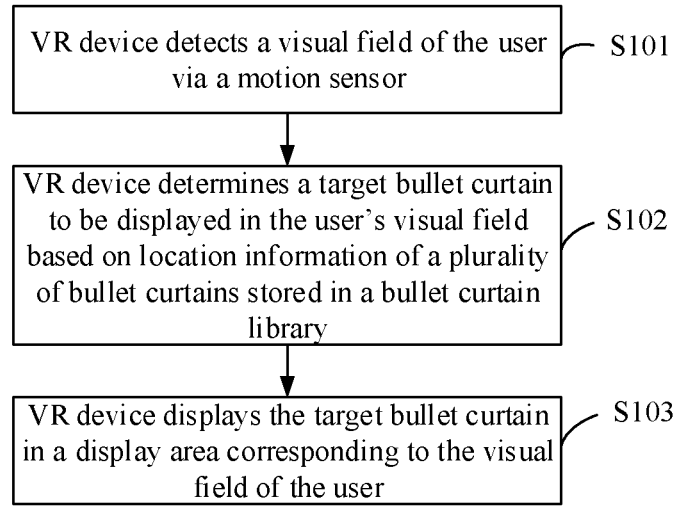
FIG. 1 is a flow chart illustrating a method for displaying a bullet curtain in a VR video according to an aspect of the disclosure.

FIG. 1 is a flow chart illustrating a method for displaying a bullet curtain in a VR video according to an aspect of the disclosure. The method may be applied in a Virtual Reality (VR) scenario and performed by a VR device which can be a VR eye, a VR helmet, or the like. When a user is watching the VR video, the user can change the direction of his/her head to change current display content. For example, when looking up to the sky, the user may see the screen moving up and showing the sky or a ceiling above the user's head. The screen as seen by the user may seem to be surrounding the user, so the VR video may also be referred to as a panoramic video. During playback of the VR video, when the bullet curtain is displayed in a manner of the existing 2D plan display, the bullet curtain can only be displayed at a fixed position, thereby resulting in a bad user experience.

With the method, the display position of the bullet curtain may be associated with a current display area, so that the user can see both different display content and different bullet curtains when the user faces different positions at a same time. As shown in FIG. 1, the method for displaying the bullet curtain in the VR video may include the following steps.

In step S101, the VR device may detect a visual field of the user via a motion sensor.

The motion sensor in the VR device may detect the user's head movement, determine the direction of the user's eyes based on the user's head movement parameters, and then determine the user's visual field based on the direction of the user's eyes. In one or more embodiments, the user's visual field may have a shape of a rectangle, a circle, an ellipse or other polygons.

In step S102, the VR device may determine a target bullet curtain to be displayed in the user's visual field based on location information of a plurality of bullet curtains stored in a bullet curtain library. The target bullet curtain may include the most recent comment or feedback from a send who is watching the live cast of the VR video.

For example, the VR device may acquire the location information of each bullet curtain in the bullet curtain library when the bullet curtain is sent by the sender. The location information of the bullet curtain may be a center point of the visual field of a sender at the moment the bullet curtain is sent, or the visual field of the sender at the moment the bullet curtain is sent. The visual field of the sender at the moment the bullet curtain is sent by the sender may be acquired by two ways as follows. First, the visual field may be input by the sender via an input device before sending the bullet curtain. Second, the visual field may be acquired by the VR device through detection of the sender's head movement via the motion sensor. In the first way, the sender of the bullet curtain may flexibly set the position of the bullet curtain as desired, but needs to manually input the information. The operation is not convenient for this way. The second way may be more intelligent and convenient, since the VR device may automatically detect the visual field of the sender of the bullet. Here, the user's visual field may have a shape of a rectangle, a circle, an oval, or other polygons.

The VR device may determine the target bullet curtain to be displayed in the user's visual field based on location information of the plurality of bullet curtains stored in the bullet curtain library using following implementations. When the location information of each bullet curtain is the center point of the sender's visual field at the moment the bullet curtain is sent, it may be determined whether the center point of the sender's visual field at the moment each bullet curtain is sent is within the user's visual field. When the center point of the sender's visual field at the moment a certain bullet curtain is sent is within the user's visual field, it may be determined that the bullet curtain is the target bullet curtain. When the center point of the sender's visual field at the moment the certain bullet curtain is sent is not within the user's visual field, the step may proceed to make a determination for the next bullet curtain until all the bullet curtains have been considered. One or more target bullet curtains may be determined.

When the location information of each bullet curtain is the sender's visual field at the moment the bullet curtain is sent, it may be determined whether the sender's visual field at the moment each bullet curtain is sent has an overlap with the user's visual field. When the sender's visual field at the moment a certain bullet curtain is sent has an overlap with the user's visual field, it may be determined that the bullet curtain is the target bullet curtain. When there is no overlap between the sender's visual field and the user's visual field, the step may proceed to make a determination for the next bullet curtain. Alternatively or additionally, in the case that the sender's visual field at the moment the certain bullet curtain is sent has the overlap with the user's visual field, it may be further determined whether an area of the overlap is larger than a first preset threshold. When the area of the overlap is larger than the first preset threshold, it may be determined that the bullet curtain is the target bullet curtain. As the user's visual field changes, the target bullet curtain within the visual field may change. In this way, the user may see different bullet curtains when facing different locations at a same time and thus have a better experience. Furthermore, the bullet curtains presented at the same time may be scattered, thereby avoiding too many bullet curtains covering the entire screen.

The plurality of bullet curtains may include real-time bullet curtains and/or historical bullet curtains. When the VR video is a pre-recorded video, the bullet curtains displayed on the current screen may include the real-time bullet curtains sent by the user or other users, and may also include the historical bullet curtains sent by the user or other users. Here, the real-time bullet curtains represent the bullet curtains in the VR video that are sent by the user or other users in real time at the current time; and the historical bullet curtains represent the bullet curtains in the VR video that are sent by the user or other users during a time period before the current time. In the case that the VR video is a live video or a game video or a real-time interactive video, the bullet curtains displayed on the current screen are the real-time bullet curtains.

In step S103, the VR device may display the target bullet curtain in a display area corresponding to the visual field of the user.

There may be one or more target bullet curtains. When there are more than one target bullet curtains, the target curtains may be displayed after all the target curtains have been determined, or each target curtain may be displayed once the target curtain is determined and other target curtains may be determined while the target curtain is being displayed. The former implementation may cause a delay in the display of the bullet curtains, while the latter implementation can display the bullet curtains timely and offer a better experience for the user. In the former implementation, more than one target bullet curtains may be displayed in a certain order. As an example, according to a sequential order of sending times of the target bullet curtains, the target bullet curtain which sending time is closest to the current time may be displayed first. The playback direction and the playback format of the target bullet curtain may be predefined. The playback direction may be from left to right, from right to left, from top to bottom, or from bottom to top. The playback format may include a size, a font and a color of the text of the bullet curtain.

For example, during the playback of the VR video, the VR device may detect the visual field of the user, determine the target bullet curtain to be displayed in the user's visual field based on location information of the plurality of bullet curtains stored in the bullet curtain library, and then display the target bullet curtain in the display area corresponding to the visual field of the user. With the method, depending on different visual fields of the user, different bullet curtains can be displayed in the display area corresponding to the visual field of the user, so that the user can see different bullet curtains when facing different locations at a same time and thus have a better experience.

Figure 2:
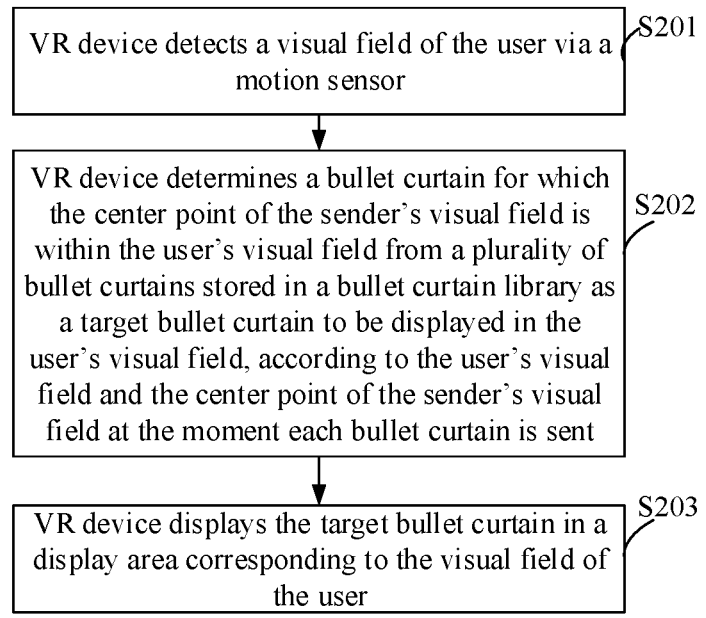
FIG. 2 is a flow chart illustrating a method for displaying a bullet curtain in a VR video according to an aspect of the disclosure.

On the basis of the example in FIG. 1, FIG. 2 is a flow chart illustrating a method for displaying a bullet curtain in a VR video according to an aspect of the disclosure. In one or more embodiments, location information of the bullet curtain is a center point of a sender's visual field at the moment the bullet curtain is sent. As shown in FIG. 2, the method for displaying the bullet curtain in the VR video may include the following steps.

In step S201, the VR device may detect a visual field of a user via a motion sensor.

In step S202, the VR device may determine a bullet curtain for which the center point of the sender's visual field is within the user's visual field from a plurality of bullet curtains stored in a bullet curtain library as a target bullet curtain to be displayed in the user's visual field, according to the user's visual field and the center point of the sender's visual field at the moment each bullet curtain is sent.

In particular, it may be sequentially determined whether the center point of the sender's visual field at the moment each bullet curtain is sent is within the user's visual field. When the center point of the sender's visual field at the moment a certain bullet curtain is sent is within the user's visual field, it may be determined that the bullet curtain is the target bullet curtain to be displayed in the user's visual field. When the center point of the sender's visual field at the moment the certain bullet curtain is sent is not within the user's visual field, then the step may proceed to make a determination for the next bullet curtain until all the bullet curtains have been traversed.

Alternatively or additionally, before determining the target bullet curtain, the plurality of bullet curtains may be sorted according to sending times of the bullet curtains. Then the VR device may start to make the determination for the bullet curtain which sending time is closest to the current time, until all the bullet curtains have been traversed. The other option is to preset a number of target bullet curtains, and complete the step of determining the target bullet curtain once the number of the target bullet curtains reaches the preset number. Also alternatively, before determining the target bullet curtain, the plurality of bullet curtains may be divided into a plurality of bullet curtain groups according to the visual field. When determining the target bullet curtain, depending on the user's visual field, a target bullet curtain group corresponding to the user's visual field may be identified and then the target bullet curtain may be determined from the target bullet curtain group. When there are many bullet curtains, the efficiency of determining the target bullet curtain can be improved by grouping.

In step S203, the VR device may display the target bullet curtain in a display area corresponding to the visual field of the user.

In some embodiments, during the playback of the VR video, the VR device may detect the visual field of the user; determine the bullet curtain for which the center point of the sender's visual field is within the user's visual field from the plurality of bullet curtains stored in the bullet curtain library as the target bullet curtain to be displayed in the user's visual field, according to the user's visual field and the center point of the sender's visual field at the moment each bullet curtain is sent; and then display the target bullet curtain in the display area corresponding to the visual field of the user. With the method, depending on different visual fields of the user, different bullet curtains can be displayed in the display area corresponding to the visual field of the user, so that the user can see different bullet curtains when facing different locations at a same time and thus have a better experience.

Figure 3:
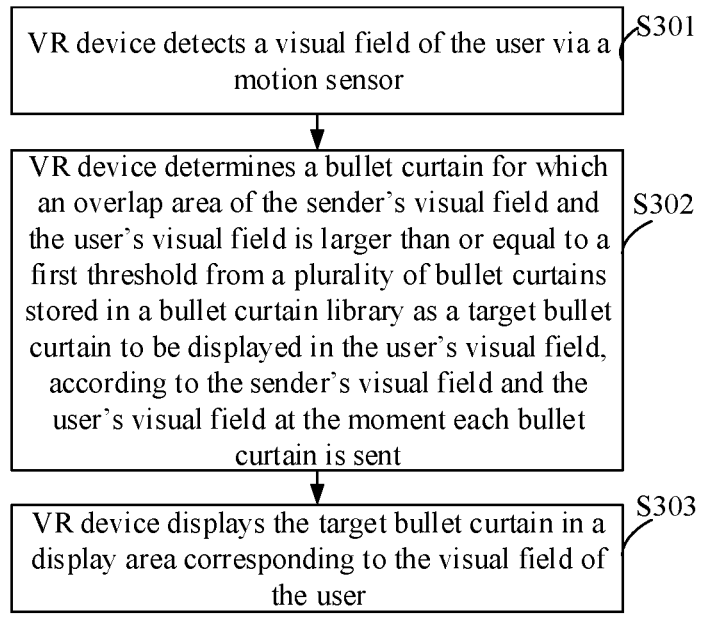
FIG. 3 is a flow chart illustrating a method for displaying a bullet curtain in a VR video according to an aspect of the disclosure.

On the basis of the embodiment as shown in FIG. 1, FIG. 3 is a flow chart illustrating a method for displaying a bullet curtain in a VR video according to an aspect of the disclosure. In one or more embodiments, location information of the bullet curtain indicates a sender's visual field at the moment the bullet curtain is sent. As shown in FIG. 3, the method for displaying the bullet curtain in the VR video may include the following steps.

In step S301, the VR device may detect a visual field of a user via a motion sensor.

In step S302, the VR device may determine a bullet curtain for which an overlap area of the sender's visual field and the user's visual field is larger than or equal to a first threshold from a plurality of bullet curtains stored in a bullet curtain library as a target bullet curtain to be displayed in the user's visual field, according to the sender's visual field and the user's visual field at the moment each bullet curtain is sent.

In particular, it may be sequentially determined whether the overlap area of the sender's visual field and the user's visual field at the moment each bullet curtain is sent is larger than the first threshold. If the overlap area of the sender's visual field and the user's visual field at the moment a certain bullet curtain is sent is larger than or equal to the first threshold, it may be determined that the bullet curtain is the target bullet curtain to be displayed in the user's visual field. If the overlap area of the sender's visual field and the user's visual field at the moment the certain bullet curtain is sent is smaller than the first threshold or there is no overlap between the sender's visual field and the user's visual field at the moment the certain bullet curtain is sent, then the step may proceed to make a determination for the next bullet curtain until all the bullet curtains have been traversed.

Alternatively or additionally, before determining the target bullet curtain, the plurality of bullet curtains may be sorted according to sending times of the bullet curtains. Then the VR device may start to make the determination for the bullet curtain which sending time is closest to the current time, until all the bullet curtains have been traversed. The other option is to preset a number of target bullet curtains, and complete the step of determining the target bullet curtain once the number of the target bullet curtains reaches the preset number. Also alternatively, before determining the target bullet curtain, the plurality of bullet curtains may be divided into a plurality of bullet curtain groups according to the visual field. When determining the target bullet curtain, depending on the user's visual field, a target bullet curtain group corresponding to the user's visual field may be identified and then the target bullet curtain may be determined from the target bullet curtain group. When there are many bullet curtains, the efficiency of determining the target bullet curtain can be improved by grouping.

In step S303, the VR device may display the target bullet curtain in a display area corresponding to the visual field of the user.

In one or more embodiments, during the playback of the VR video, the VR device may detect the visual field of the user; determine the bullet curtain for which the overlap area of the sender's visual field and the user's visual field is larger than or equal to the first threshold from the plurality of bullet curtains stored in the bullet curtain library as the target bullet curtain to be displayed in the user's visual field, according to the sender's visual field and the user's visual field at the moment each bullet curtain is sent; and then display the target bullet curtain in the display area corresponding to the visual field of the user. With the method, depending on different visual fields of the user, different bullet curtains can be displayed in the display area corresponding to the visual field of the user, so that the user can see different bullet curtains when facing different locations at a same time and thus have a better experience.

Figure 4:
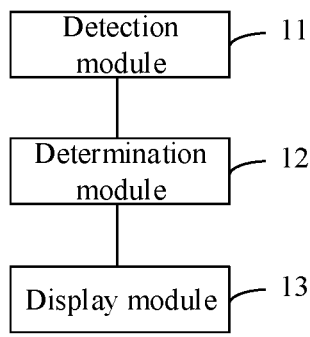
FIG. 4 is a block diagram illustrating an apparatus for displaying a bullet curtain in a VR video according to an aspect of the disclosure.

FIG. 4 is a block diagram illustrating an apparatus for displaying a bullet curtain in a VR video according to an aspect of the disclosure. As shown in FIG. 4, the apparatus for displaying the bullet curtain in the VR video according to the embodiment may include the following modules.

A detection module 11 may be configured to detect a current visual field of a user via a motion sensor.

A determination module 12 may be configured to determine a target bullet curtain to be displayed in the user's visual field based on location information of a plurality of bullet curtains stored in a bullet curtain library.

A display module 13 may be configured to display the target bullet curtain in a display area corresponding to the visual field of the user.

Figure 5:
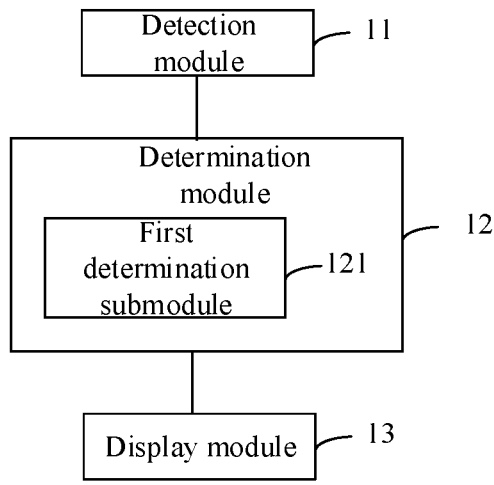
FIG. 5 is a block diagram illustrating an apparatus for displaying a bullet curtain in a VR video according to an aspect of the disclosure.

FIG. 5 is a block diagram illustrating an apparatus for displaying a bullet curtain in a VR video according to an aspect of the disclosure. Here, location information of the bullet curtain may be a center point of a sender's visual field at the moment the bullet curtain is sent. As shown in FIG. 5, the apparatus is based on the apparatus as shown in FIG. 4. The determination module 12 may include a first determination submodule 121 configured to determine a bullet curtain for which the center point of the sender's visual field is within the user's visual field from the plurality of bullet curtains as the target bullet curtain, according to the user's visual field and the center point of the sender's visual field at the moment each bullet curtain is sent.

Alternatively or additionally, the sender's visual field at the moment each bullet curtain is sent may be input by the sender via an input device. Again alternatively, the sender's visual field at the moment each bullet curtain is sent may be acquired by detection of the sender's head movement via the motion sensor.

Figure 6:
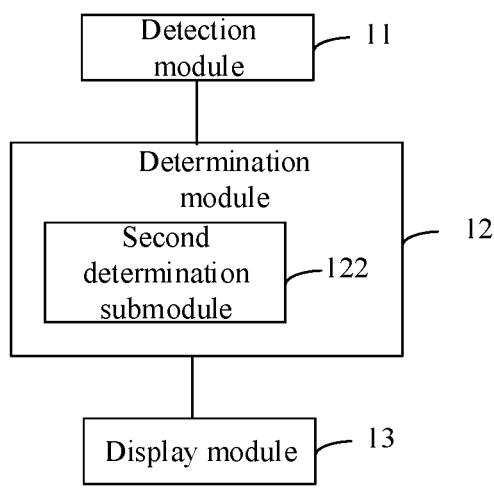
FIG. 6 is a block diagram illustrating an apparatus for displaying a bullet curtain in a VR video according to an aspect of the disclosure.

FIG. 6 is a block diagram illustrating an apparatus for displaying a bullet curtain in a VR video according to an aspect of the disclosure. In the some embodiments, location information of the bullet curtain may indicate a sender's visual field at the moment the bullet curtain is sent. For example, the location information of the bullet curtain may be the sender's visual field at the moment when the content of the bullet curtain is sent by the sender. As shown in FIG. 6, the apparatus of may be based on the apparatus as shown in FIG. 4. The determination module 12 may include a second determination submodule 122 configured to determine a bullet curtain for which an overlap area of the sender's visual field and the user's visual field is larger than or equal to a first threshold from the plurality of bullet curtains as the target bullet curtain, according to the sender's visual field and the user's visual field at the moment each bullet curtain is sent.

Alternatively or additionally, the sender's visual field at the moment each bullet curtain is sent may be input by the sender via an input device. Again alternatively, the sender's visual field at the moment each bullet curtain is sent may be acquired by detection of the sender's head movement via the motion sensor.

The individual modules in the apparatuses for displaying the bullet curtain in the VR video as shown in FIG. 4 to FIG. 6 may be configured to perform the methods for displaying the bullet curtain in the VR video as shown in FIG. 1 to FIG. 3. The specific implementations and technical effects are similar to those of the above method embodiments, and thus will not be repeated herein.

Figure 7:
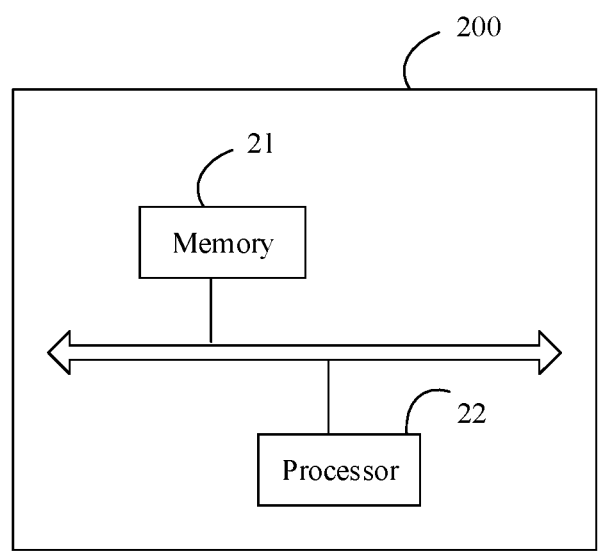
FIG. 7 is an entity block diagram illustrating an apparatus for displaying a bullet curtain in a VR video according to an aspect of the disclosure.

FIG. 7 is an entity block diagram illustrating an apparatus for displaying a bullet curtain in a VR video according to an aspect of the disclosure. As shown in FIG. 7, the apparatus 300 for displaying the bullet curtain in the VR video may include a processor 21 and a memory 22 for storing instructions executable by the processor 21, wherein the memory 22 may be connected to and communicate with the processor 21 via a system bus.

The processor 21 may be configured to detect a current visual field of a user via a motion sensor; determine a target bullet curtain to be displayed in the user's visual field based on location information of a plurality of bullet curtains stored in a bullet curtain library; and display the target bullet curtain in a display area corresponding to the visual field of the user.

It is to be understood that in the above embodiment, the processor may be a Central Processing Unit (CPU), and may be other general-purpose processors, a Digital Signal Processor (DSP), an Application Specific Integrated Circuit (ASIC) and so on. The general-purpose processor may be a microprocessor or any conventional processor, etc. The aforementioned memory may be a read-only memory (ROM), a random access memory (RAM), a flash memory, a hard disk or a solid state hard drive. The steps of the methods disclosed in connection with the embodiments of the present disclosure may be embodied directly by the execution of the hardware processor or by the execution of the combination of hardware and software modules in the processor.

Other embodiments of the invention will be apparent to those skilled in the art from consideration of the specification and practice of the invention disclosed here. This application is intended to cover any variations, uses, or adaptations of the disclosure following general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for displaying a bullet curtain in a Virtual Reality (VR) video, comprising:

detecting, by a VR device, a visual field of a user via a motion sensor;

determining, by the VR device, a target bullet curtain to be displayed in the visual field of the user based on location information of a plurality of bullet curtains stored in a bullet curtain library; and displaying, by the VR device, the target bullet curtain in a display area corresponding to the visual field of the user, wherein the location information of each of the plurality of bullet curtains indicates a sender's visual field when the bullet curtain is sent by the sender watching the VR video; and wherein determining, by the VR device, the target bullet curtain to be displayed in the visual field of the user based on the location information of the plurality of bullet curtains stored in the bullet curtain library comprises:

determining, by the VR device, a bullet curtain for which an overlap area of the sender's visual field and the user's visual field is larger than or equal to a first threshold from the plurality of bullet curtains as the target bullet curtain, according to the sender's visual field and the user's visual field at the moment each bullet curtain is sent.

2. The method of claim 1, wherein each of the plurality of bullet curtains is sent by a sender watching the VR video; and wherein the location information of each of the plurality of bullet curtains is a center point of the sender's visual field at the moment the bullet curtain is sent.

3. The method of claim 2, wherein determining, by the VR device, the target bullet curtain to be displayed in the visual field of the user based on the location information of the plurality of bullet curtains stored in the bullet curtain library comprises:

determining, by the VR device, a bullet curtain for which the center point of the sender's visual field is within the user's visual field from the plurality of bullet curtains as the target bullet curtain, according to the user's visual field and the center point of the sender's visual field at the moment each bullet curtain is sent.

4. The method of claim 1, further comprising:
receiving an input indicating the sender's visual field at the moment each bullet curtain is sent by the sender via an input device.

5. The method of claim 1, further comprising:
acquiring the sender's visual field at the moment each bullet curtain is sent by detection of the sender's head movement via the motion sensor.

6. An apparatus for displaying a bullet curtain in a Virtual Reality (VR) video, comprising:
a processor; and
a memory configured to store instructions executable by the processor,
wherein the processor is configured to:
detect a visual field of a user via a motion sensor;
determine a target bullet curtain to be displayed in the user's visual field based on location information of a plurality of bullet curtains stored in a bullet curtain library; and
display the target bullet curtain in a display area corresponding to the visual field of the user,
wherein the location information of each of the plurality of bullet curtains indicates a sender's visual field at the moment the bullet curtain is sent, and the processor is further configured to:
determine a bullet curtain for which an overlap area of the sender's visual field and the user's visual field is larger than or equal to a first threshold from the plurality of bullet curtains as the target bullet curtain, according to the sender's visual field and the user's visual field at the moment each bullet curtain is sent.

7. The apparatus of claim 6, wherein the location information of each of the plurality of bullet curtains indicates a center point of a sender's visual field at the moment the bullet curtain is sent, and the processor is further configured to:

determine a bullet curtain for which the center point of the sender's visual field is within the user's visual field from the plurality of bullet curtains as the target bullet curtain, according to the user's visual field and the center point of the sender's visual field at the moment each bullet curtain is sent.

8. The apparatus of claim 6, wherein the sender's visual field at the moment each bullet curtain is sent is input by the sender via an input device.

9. The apparatus of claim 6, wherein the sender's visual field at the moment each bullet curtain is sent is acquired by detection of the sender's head movement via the motion sensor.

10. A non-transitory computer-readable storage medium having stored therein instructions that, when executed by a processor, causes the processor to perform a method for displaying a bullet curtain in a Virtual Reality (VR) video, the method comprising:

detecting a visual field of a user via a motion sensor;
determining a target bullet curtain to be displayed in the user's visual field based on location information of a plurality of bullet curtains stored in a bullet curtain library; and
displaying the target bullet curtain in a display area corresponding to the visual field of the user,
wherein the location information of each of the plurality of bullet curtains indicates a sender's visual field when the bullet curtain is sent by the sender watching the VR video; and
wherein determining, by the VR device, the target bullet curtain to be displayed in the visual field of the user based on the location information of the plurality of bullet curtains stored in the bullet curtain library comprises:
determining, by the VR device, a bullet curtain for which an overlap area of the sender's visual field and the user's visual field is larger than or equal to a first threshold from the plurality of bullet curtains as the target bullet curtain, according to the sender's visual field and the user's visual field at the moment each bullet curtain is sent.

11. The non-transitory computer-readable storage medium of claim 10, wherein each of the plurality of bullet curtains is sent by a sender watching the VR video; and wherein the location information of each of the plurality of bullet curtains is a center point of the sender's visual field at the moment the bullet curtain is sent.

12. The non-transitory computer-readable storage medium of claim 11, wherein determining, by the VR device, the target bullet curtain to be displayed in the visual field of the user based on the location information of the plurality of bullet curtains stored in the bullet curtain library comprises:

determining, by the VR device, a bullet curtain for which the center point of the sender's visual field is within the user's visual field from the plurality of bullet curtains as the target bullet curtain, according to the user's visual field and the center point of the sender's visual field at the moment each bullet curtain is sent.

* * * * *